(12) United States Patent
Rossmann et al.

(10) Patent No.: US 7,849,110 B2
(45) Date of Patent: Dec. 7, 2010

(54) DATABASE GARBAGE COLLECTOR

(75) Inventors: Albert P. Rossmann, Wiesloch (DE);
Lutz Garstecki, Muehlhausen (DE)

(73) Assignee: SAP AG, Walldorf (DE)

( * ) Notice: Subject to any disclaimer, the term of this patent is extended or adjusted under 35 U.S.C. 154(b) by 490 days.

(21) Appl. No.: 11/648,072

(22) Filed: Dec. 30, 2006

(65) Prior Publication Data
US 2008/0162610 A1    Jul. 3, 2008

(51) Int. Cl.
*G06F 17/30*    (2006.01)

(52) U.S. Cl. .................. 707/813; 711/154; 711/155; 711/156

(58) Field of Classification Search .................. None
See application file for complete search history.

(56) References Cited

U.S. PATENT DOCUMENTS

| | | | |
|---|---|---|---|
| 6,219,666 B1 * | 4/2001 | Krishnaswamy et al. | 707/8 |
| 6,363,403 B1 * | 3/2002 | Roy et al. | 707/206 |
| 2005/0091287 A1 * | 4/2005 | Sedlar | 707/200 |
| 2005/0149526 A1 * | 7/2005 | Wiser et al. | 707/8 |
| 2006/0074977 A1 * | 4/2006 | Kothuri et al. | 707/104.1 |

OTHER PUBLICATIONS

Tanter et al. (LNCS, vol. 4089/2006, pp. 227-242, Springer Berlin / Heidelberg, Aug. 2006).*

* cited by examiner

*Primary Examiner*—Etienne P LeRoux
*Assistant Examiner*—Anteneh Girma
(74) *Attorney, Agent, or Firm*—Schwegman, Lundberg & Woessner, P.A.

(57) ABSTRACT

A database garbage collector that removes appropriate database entries accessed during a recent transaction.

8 Claims, 5 Drawing Sheets

DATABASE GARBAGE COLLECTOR

FIELD

Embodiments of the invention relate generally to the field of data processing systems. More particularly, the embodiments of the invention relate to database garbage collection.

BACKGROUND

The Java program runtime environment (e.g., Java virtual machine "VM" or "JVM") provides a built-in mechanism for allocating and deallocating memory in a computing system. In Java, memory is allocated to objects. The JVM automatically handles the amount and allocation of memory upon an object's creation. The Java runtime environment employs a "garbage collector" ("GC") to reclaim the memory allocated to an object that is no longer needed, as for example, when an object is deleted. Once the GC determines that the object is no longer accessible (e.g., when there is no longer any references to it stored in any variables, the fields of objects, or the elements of any arrays, etc.), it reclaims the allocated memory. When objects in a Java application are no longer referenced, the heap space the object occupied is to be recycled so that the space becomes available for subsequently-created objects.

While Java provides for automatic GC at the application layer, what is needed is a similar mechanism at the database or persistence layer.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
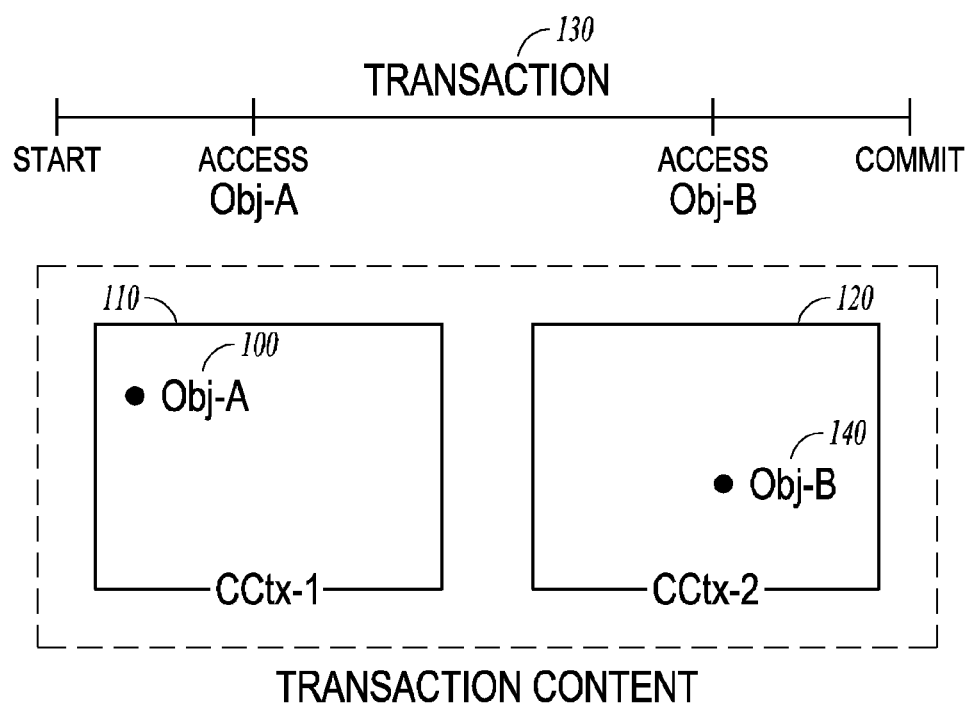
FIG. 1 illustrates a transaction in which an embodiment of the invention operates.

In one embodiment of the invention, a database garbage collector system removes entries from a reference table. The reference table references objects that are mapped to entries in one or more tables in an associated database. The removal occurs periodically or is triggered by the end of an application layer transaction involving access to the database.

More particularly, a database manager builds the reference table and creates an entry in it when an application layer program creates a corresponding object, and deletes the entry in the reference table when the application layer program deletes the corresponding object. However, the database manager does not delete any existing reference from the entry in the reference table that corresponds to the deleted object to another entry in the reference table corresponding to another object, nor does the database manager delete any existing entry in the reference table corresponding to the referenced object. Rather, the database garbage collector (DBGC) performs these clean-up tasks, as described more fully below. In general, the DBGC determines if an entry in the reference table corresponding to the referenced object is no longer being referenced by an entry in the reference table corresponding to another, referencing, object, and if so, removes the referenced entry in the reference table corresponding to the referenced object, and reclaims the storage space in the database corresponding to referenced object.

In databases, ACID stands for the properties of Atomicity, Consistency, Isolation, and Durability. These properties are key transaction processing features of a database management system (DBMS) to ensure the integrity of the database.

In the context of databases, a single logical operation on the data is called a transaction. An example of a transaction is a transfer of funds from one account to another, even though it might consist of multiple individual operations (such as debiting one account and crediting another). The ACID properties guarantee that such transactions are processed reliably.

Atomicity refers to the ability of the DBMS to guarantee that either all of the tasks of a transaction are performed or none of them are. The transfer of funds can be completed or it can fail for a multitude of reasons, but atomicity guarantees that one account won't be debited if the other is not credited as well.

Consistency refers to the database being in a legal state when the transaction begins and when it ends. This means that a transaction can't break the rules, or integrity constraints, of the database. If an integrity constraint states that all accounts must have a positive balance, then any transaction violating this rule will be aborted.

Isolation refers to the ability of the application to make operations in a transaction appear isolated from all other operations. This means that no operation outside the transaction can ever see the data in an intermediate state; a bank manager can see the transferred funds on one account or the other, but never on both—even if a query is performed while the transfer was still being processed. More formally, isolation means the transaction history (or schedule) is serializable.

Durability refers to the guarantee that once the user has been notified of success, the transaction will persist, and not be undone. This means it will survive system failure, and that the database system has checked the integrity constraints and won't need to abort the transaction. Typically, all transactions are written into a log that can be played back to recreate the system to its state right before the failure. A transaction can only be deemed committed after it is safely in the log.

Storing of Objects

In one embodiment of the invention, all actions are performed with a transaction. Each transaction relates to a set of objects referred to herein as a transaction context. These objects, in turn, are bundled into one or more creation contexts. If an object is accessed during a transaction, the creation context to which it belongs is locked and added to the transaction context for the transaction. Thus, the transaction context is not a fixed, defined set of objects, but an expandable set, where each transaction context may involve one or more creation contexts. A transaction manager tracks which creation contexts relate to which transaction context.

Figure 2:
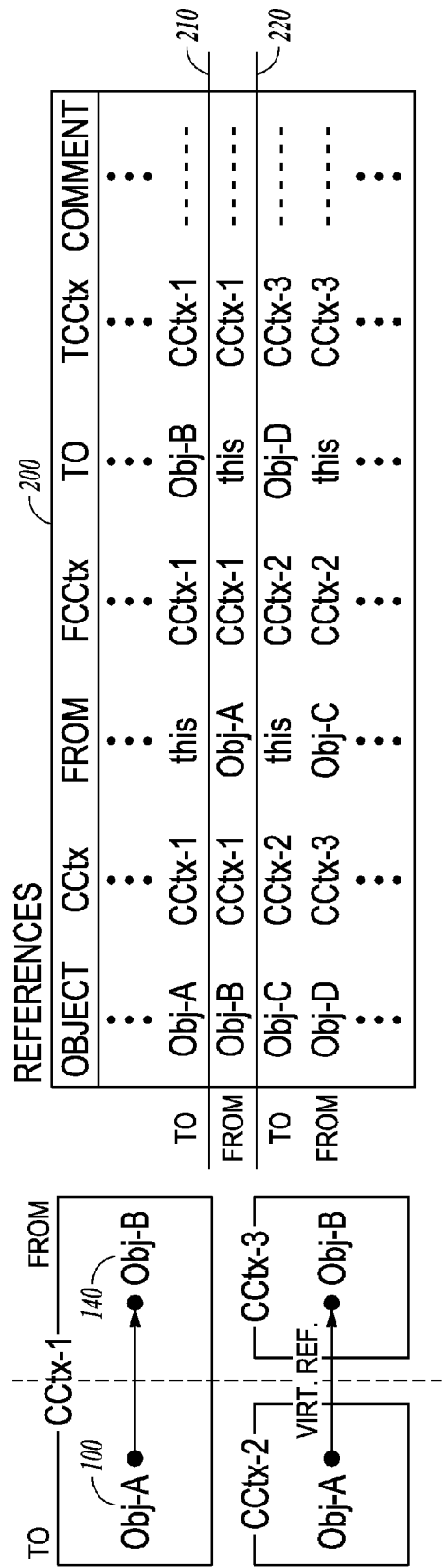
FIG. 2 illustrates updating a reference table according to an embodiment of the invention.

FIG. 1 shows that if an object, e.g., object Obj-A 100, is accessed within a transaction 130, its creation context, CCtx-1 110, is added to the transaction context 120 for the transaction. If an object references another object, the reference can be thought of as being divided into two parts: a TO-part, which is the part that points away from a referencing object; and a FROM-part, which is the part that points to the referenced object. FIG. 2 illustrates that if an object, e.g., Obj-A 100 references another object, e.g., Obj-B 140, the reference relates to two entries in the reference table 200, one entry for the TO-part 210 and one entry for the FROM-part 220.

The general procedure for a transaction is as follows:
1. Begin transaction
2. Access object
   a. identify related creation context
   b. lock identified creation context
   c. modify object
3. Repeat step 2 for each object to access within this transaction
4. Commit transaction At the end of the transaction (i.e., after commit), all objects must be in consistent form. Therefore, in one embodiment of the invention, garbage collection is triggered, which checks the data represented by the objects and ensures there is consistency. The database garbage collector (DBGC) checks only objects involved in the transaction, that is, only objects in the related transaction context.

Database Garbage Collector

In one embodiment of the invention, the database garbage collector (DBGC) views only a limited number of creation contexts at a given point in time, for example, only the creation contexts that are in the transaction context relating to a current transaction. In the following discussion, for ease of understanding, it is assumed only one creation context exists within the transaction context, so that the DBGC has only one creation context to check.

At the end of a transaction, a garbage collection is triggered, and the DBGC checks all objects in the creation context for their reachability, that is, whether another object (the referencing object) that references an object (the referenced object) still exists. If so, the referenced object is reachable, if not, the referenced object is unreachable. This process is in contrast to typical garbage collection performed at the application layer, in which the GC checks all objects for their reachability from so-called root objects, not just those objects within a creation context. (A root object is a special object which is always reachable).

In this embodiment of the invention, because the DBGC does not check all objects but only those objects within the creation context, the DBGC does not necessarily check reachability from root objects, as a root object may not be included in the creation context. Further, the DBGC check objects for reachability from any objects within the same or different creation contexts that belong to the same transaction context.

Figure 5:
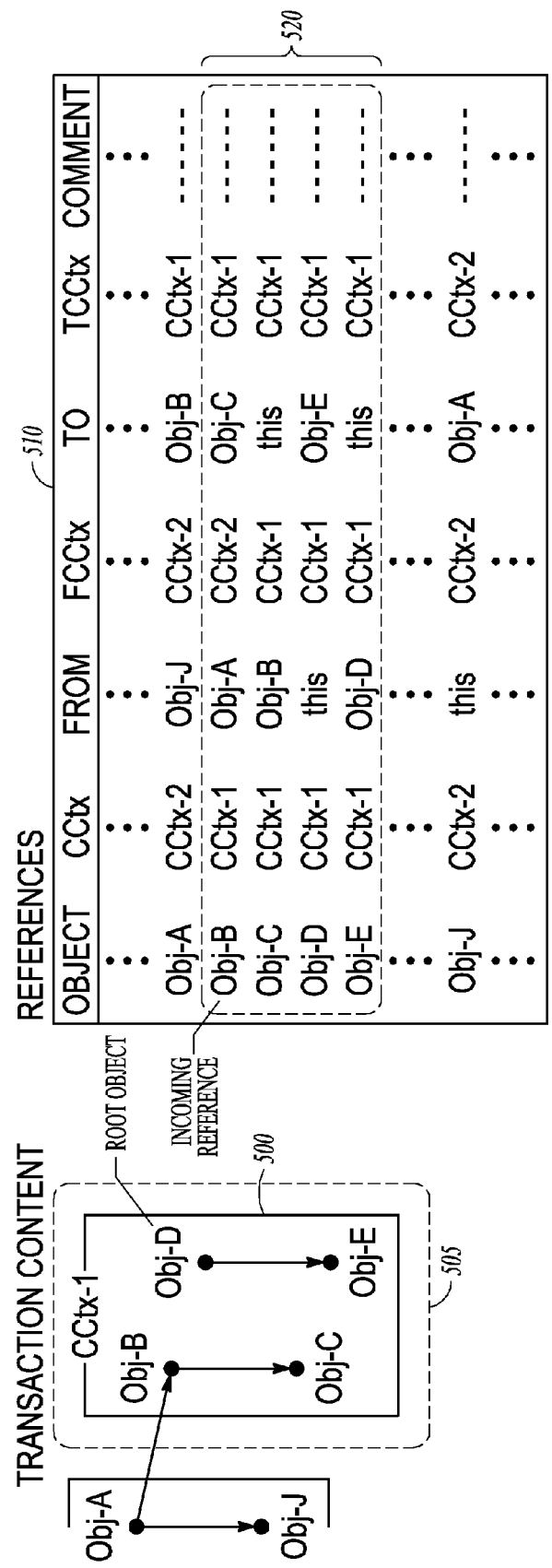
FIG. 5 illustrates accessing a reference table according to an embodiment of the invention.

With reference to FIG. 5, the DBGC checks all objects of creation context CCtx-1 500 for their reachability from incoming references. All objects that are not reachable any longer are marked as unreachable and their status is set to DELETE. The DBGC then further needs to update the reference table 510, by deleting the unreachable references. Transaction context 505 includes only creation context CCtx-1 500, and thus, the only objects checked in reference table 510 are those indicated at 520, i.e., Obj-B, Obj-C, Obj-D and Obj-E. Objects in another creation context, e.g., Obj-A and Obj-J are not checked for reachability, as these objects are located in a different creation context that is not included in transaction context 505, and thus, not accessed during the transaction.

Figures 3A, 3B:
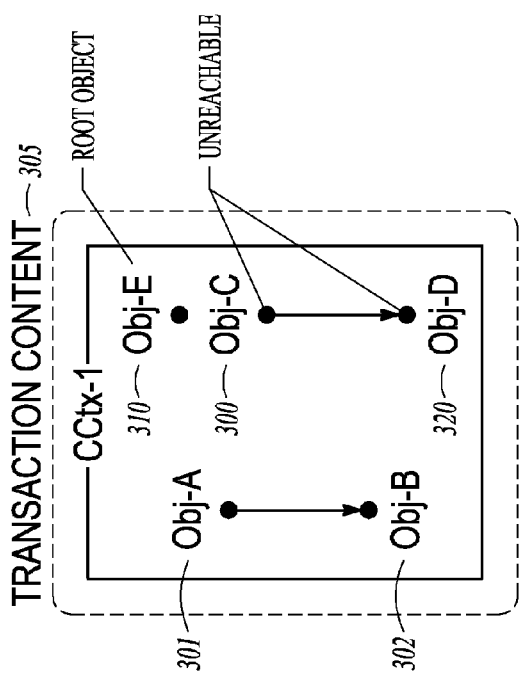
FIGS. 3A and 3B illustrate updating a reference table according to an embodiment of the invention.

With reference to FIG. 3A, a transaction context 305 comprises a single creation context 315, which, in turn, includes objects Obj-A 301, Obj-B 302, Obj-C 300, Obj-D 320 and Obj-F 310 (a root object). In this example, the root object Obj-F 310 is deleted. Given such, object Obj-C 300 is not reachable. Likewise, since Obj-C 300 is not reachable, Obj-D 320 is also not reachable, because Obj-C 300 references Obj-D 320 (or stated another way, Obj-D 320 is referenced by Obj-C 300). Thus, both objects Obj-C and Obj-D are marked as unreachable and their status is set to DELETE, as depicted in FIG. 3B by respective lined-through entries 330 and 340 in reference table 350.

In FIG. 4 two creation contexts are illustrated, creation context CCtx-1 400 and creation context CCtx-2 410. Creation context CCtx-1 400 is in transaction context 420, while creation context CCtx-2 410 is not. Further note in this example that object Obj-E 440 is deleted. Given Obj-E 440 is deleted, Obj-C 450 is now unreachable. And since Obj-C 450 provides a reference to Obj-D 460 in creation context CCtx-2 410, Obj-D 460 is also unreachable. Remember from the above discussion, however, that the DBGC views only those objects in the creation contexts that are part of the current transaction context. Thus, in this example, the DBGC only views objects in creation context CCtx-1 400, which is within transaction context 420, but does not consider ("view") the status of objects in creation context CCtx-2 410, including Obj-D 460, since creation context CCtx-2 410 is outside transaction context 420.

Figures 4A, 4B:
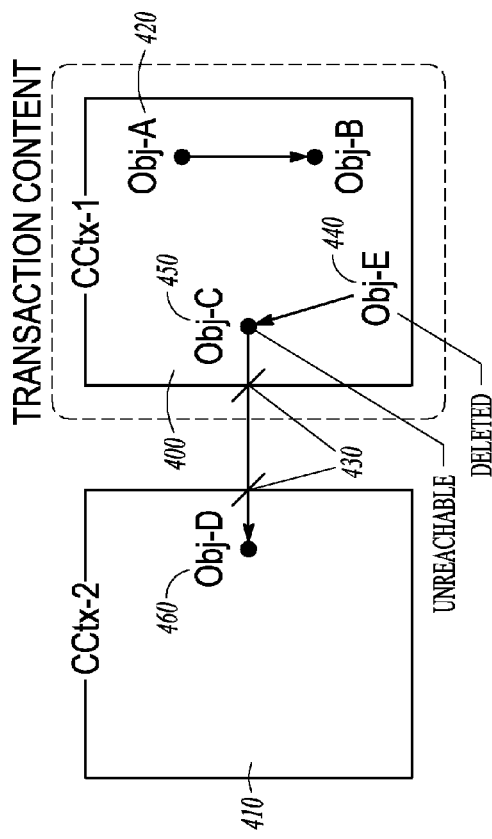
FIGS. 4A and 4B illustrate updating a reference table according to an embodiment of the invention.

With reference to FIG. 4B, in this instance, the DBGC deletes from reference table 490 the TO-part of the reference at 470 for Obj-C 450 that belongs to CCtx-1 400 and marks as "to-delete" the FROM-part of the reference at 480 for Obj-D 460 that belongs to CCtx-2 410. The DBGC does not actually delete the reference at 480 since Obj-D 460 is a member of creation-context CCtx-2, which is not included in transaction context 420.

If creation context CCtx-2 410 is accessed during another transaction at some future point in time, the DBGC for that transaction checks that the incoming reference for Obj-D 460 does not exist any longer (as noted at 430 in FIG. 4A and at 470 in FIG. 4B), and it deletes this reference part from Reference table 490.

If an object is no longer used at the application layer, for example, by a Java program statement that sets the value of the object to null, then the database manager deletes automatically the respective reference from the reference table. In such a case, at the end of a transaction, a database garbage collector checks whether the object is referenced from other objects. If not, the object's status is set to DELETE. Other objects referenced by this deleted object are considered, so long as they are members of the same creation context, and their status is set to DELETE as well. If a deleted object references another object in a different creation context, the reference to the other object is marked as "to-delete", and the garbage collector can consider deleting the other object if and when another transaction includes the creation context to which the other object belongs in the transaction's transaction context.

Periodically the database manager, for example, at the end of a transaction, persists the data to a database by generating appropriate database statement for transfer of the data to the database. As part of this process, the database manager parses the reference table to ensure the status of each object is included as an attribute for the respective data transferred to the database.

An embodiment of the invention may be a machine-readable medium having stored thereon instructions which cause a programmable processor to perform operations as described above. In other embodiments, the operations might be performed by specific hardware components that perform the same functions. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that embodiments of the invention can also be produced by software and hardware that distribute the functions of embodiments of this invention differently than herein described. Such variations and implementations are understood to be captured according to the following claims.

What is claimed is:

1. A method for garbage collection of a database, the method, comprising:
   beginning a first transaction having a transaction context;
   determining one or more creation contexts that belong to the transaction context, wherein the one or more creation contexts include objects accessed during the first transaction;
   locking the one or more creation contexts for the transaction context in response to the determining;
   updating a respective entry in a reference table for each object of the one or more locked creation contexts in the transaction context, each entry indicating any references to and from the object relative to other objects from the one or more locked creation contexts;
   committing the first transaction;
   responsive to committing the first transaction:
      checking the reference table only for entries belonging to the first transaction context to determine for each such entry whether there are any references to the corresponding object from the other objects;
      deleting from the reference table any checked entry belonging to the first transaction context for which there is no reference to the corresponding object from the other objects; and
      reclaiming storage space, in the database associated with the corresponding object of the deleted entry.

2. The method of claim 1, further comprising, responsive to committing the first transaction, marking as "to-delete" from the reference table any entry corresponding to an object referenced by the deleted entry, wherein the deleted entry belonged to the object of the first transaction context, and wherein the marked entry is of an object that belongs to a creation context of a second transaction context.

3. The method of claim 2, further comprising:
   beginning a second transaction having the second transaction context;
   determining one or more creation contexts that belong to the second transaction context, wherein the one or more creation contexts include objects accessed during the second transaction:
   locking the one or more creation contexts for the second transaction context in response to the determining;
   updating the entry in the reference table for each object belonging to the one or more locked creation contexts of the second transaction context, each entry indicating any reference to and from the object relative to other objects from the one or more locked creation contexts for the second transaction context and from other creation contexts, wherein the other creation contexts include the one or more creation contexts belonging to the first transaction;
   committing the second transaction;
   responsive to committing the second transaction:
      checking the reference table only for entries belonging to the second transaction to determine for each such entry whether there are any references to the corresponding object from the other objects;
      deleting from the reference table any checked entry belonging to the second transaction context for which there is no reference to the corresponding object from the other objects; and
      deleting the entry marked as "to-delete" from the reference table.

4. An article of manufacture comprising a computer readable medium having instructions stored thereon that when executed by a machine, cause the machine to perform a method for garbage collection of a database the method comprising:
   beginning a first transaction having a transaction context;
   determining one or more creation contexts that belong to the transaction context, wherein the one or more creation contexts include objects accessed during the first transaction;
   locking the one or more creation contexts for the transaction context in response to the determining;
   updating a respective entry in a reference table for each object of the one or more locked creation contexts in the transaction context, each entry indicating any references to and from the object relative to other objects from the one or more locked creation contexts and from other creation contexts;
   committing the first transaction;
   responsive to committing the first transaction:
      checking the reference table only for entries belonging to the first transaction context to determine for each such entry whether there are any references to the corresponding object from the other objects;
      deleting from the reference table any checked entry belonging to the first transaction context for which there is no reference to the corresponding object from the other objects; and
      reclaiming storage space, in the database, associated with the corresponding object of the deleted entry.

5. The article of manufacture of claim 4, further comprising instructions that when executed cause the machine to perform, responsive to committing the first transaction, marking as "to-delete" from the reference table any entry corresponding to an object referenced by the deleted entry, wherein the deleted entry belonged to the object of the first transaction context. and wherein the marked entry is of an object that belongs to a creation context of a second transaction context.

6. The article of manufacture of claim 5, further comprising instructions that when executed by the machine cause the machine to further perform the method comprising:
   beginning a second transaction having the second transaction context;
   determining one or more creation contexts that belong to the second transaction context, wherein the one or more creation contexts include objects accessed during the second transaction:
   locking the one or more creation contexts for the second transaction context in response to the determining;
   updating the entry in the reference table for each object belonging to the one or more locked creation contexts of the second transaction context, each entry indicating any reference to and from the object relative to other objects from the one or more locked creation contexts for the second transaction context and from other creation contexts, wherein the other creation contexts include the one or more creation contexts belonging to the first transaction;

committing the second transaction;

responsive to committing the second transaction:

checking the reference table only for entries belonging to the second transaction to determine for each such entry whether there are any references to the corresponding object from the other objects;

deleting from the reference table any checked entry belonging to the second transaction context for which there is no reference to the corresponding object from the other objects; and deleting the entry marked as "to-delete" from the reference table.

7. The method of claim 3, further comprising:

reclaiming storage space in the database for objection associated with the deleted entries in the reference table.

8. The article of manufacture of claim 6, further comprising instructions that when executed by the machine cause the machine to further perform the method comprising:

reclaiming storage space in the database for objection associated with the deleted entries in the reference table.

* * * * *